(12) United States Patent
Dunda

(10) Patent No.: US 7,107,745 B2
(45) Date of Patent: Sep. 19, 2006

(54) TRIMMER WHEELED EXTENSION ARM

(76) Inventor: Michael D. Dunda, 21727 NE. 79th, Redmond, WA (US) 98053

( * ) Notice: Subject to any disclaimer, the term of this patent is extended or adjusted under 35 U.S.C. 154(b) by 0 days.

(21) Appl. No.: 10/606,495

(22) Filed: Jun. 25, 2003

(65) Prior Publication Data

US 2004/0221560 A1    Nov. 11, 2004

Related U.S. Application Data

(60) Provisional application No. 60/469,352, filed on May 9, 2003.

(51) Int. Cl.
*A01D 34/84*    (2006.01)
(52) U.S. Cl. .......................... 56/12.7; 56/17.1
(58) Field of Classification Search ................ 56/12.7, 56/16.7, 17.1, DIG. 9; 30/276
See application file for complete search history.

(56) References Cited

U.S. PATENT DOCUMENTS

| | | | | |
|---|---|---|---|---|
| 2,608,043 A | * | 8/1952 | Berdan | 56/17.2 |
| 4,442,659 A | * | 4/1984 | Enbusk | 56/12.7 |
| 4,531,350 A | | 7/1985 | Huthmacher | 56/17.5 |
| 4,704,849 A | | 11/1987 | Gilbert | 56/17.5 |
| 4,829,755 A | | 5/1989 | Nance | 56/17.1 |
| 4,879,869 A | | 11/1989 | Buckendorf, Jr. | 56/12.7 |
| 4,891,931 A | | 1/1990 | Holland | 56/16.7 |
| 4,922,694 A | | 5/1990 | Emoto | 56/16.7 |
| 5,092,112 A | | 3/1992 | Buckendorf, Jr. | 56/17.5 |
| 5,228,276 A | | 7/1993 | Miller | 56/12.1 |
| 5,279,102 A | * | 1/1994 | Foster | 56/12.7 |
| 5,287,683 A | * | 2/1994 | Smith | 56/12.7 |
| 5,408,816 A | | 4/1995 | Cartier | 56/17.5 |
| 5,450,715 A | | 9/1995 | Murray | 56/16.9 |
| 5,459,985 A | | 10/1995 | Gedert | 56/17.2 |
| 5,477,665 A | | 12/1995 | Stout | 56/16.7 |
| 5,626,006 A | | 5/1997 | Fricke, Sr. | 56/12.7 |
| 5,836,142 A | | 11/1998 | Maxwell | 56/12.1 |
| 5,970,692 A | * | 10/1999 | Foster | 56/12.1 |

* cited by examiner

*Primary Examiner*—Meredith C. Petravick
(74) *Attorney, Agent, or Firm*—Dean A. Craine

(57) ABSTRACT

A trimmer wheeled accessory for a gas or electric powered line trimmer used to support the distal end of the trimmer pole during operation. The accessory includes an extension arm that is longitudinally aligned with the trimmer's main pole and selectively attached thereto via a first clamp. The distal end of the extension arm extends from the trimmer head. Attached to the distal end of the extension arm is a wheel assembly that supports the trimmer head at a constant elevation when cutting grass or weeds. The extension arm is sufficient in length so that the wheel accessory is located in front of the trimmer head. The extension arm may be rotated around the trimmer's main pole so that the wheel assembly may be used to support the trimmer head in both a horizontal or vertical alignment.

11 Claims, 6 Drawing Sheets

TRIMMER WHEELED EXTENSION ARM

This is a utility patent application which claims benefit of U.S. Provisional Application No. 60/469,352 filed on May 9, 2003.

BACKGROUND OF THE INVENTION

1. Field of the Invention

The present invention relates generally to the field of accessories that attach to string or line trimmers and, more particularly, to wheeled extensions that support line trimmers during use.

2. Description of the Related Art

Several wheeled accessories that attach to a handheld electric or gas-powered line trimmers have been developed in the past (see U.S. Pat. Nos. 4,531,350; 4,704,849; 4,829,755; 4,879,869; 4,891,931; 4,922,694; 5,092,112; and 5,228,276). All of these devices were developed to support a trimmer on wheels for easy mobility and to cut grass or weeds evenly during use.

Line trimmers are used for a variety of applications in the yard. For example, they can be used as mowing devices for cutting weeds and grass growing along fences or plants beds where a lawnmower cannot reach. For these applications, the head of the trimmer must be maintained horizontally so that the grass is cut evenly. Most of the trimmer wheeled accessories include two wheels that extend laterally from the trimmer's main pole. The wheels are located between the trimmer head and the user thereby creating a fulcrum between the trimmer head and the handle. During use, the fulcrum requires the user to move the handle up and down in an opposite directions relative to the trimmer head.

The use of line trimmers to make a vertical cut around a lawn or hedge is also known. Typically, this requires the user to manually hold the head of the trimmer so that the cutting line or string cuts along a vertical path. When cutting a vertical edge around a lawn, it is important to keep the cutting line or string on a vertical path and to position the distal end of the line or string slightly above the soil line so that dirt and rocks are not thrown into the air. Unfortunately, with prior art wheeled accessories that place two wheels behind the trimmer, it is difficult to precisely control the trimmer head and practical use of a line-feed feature is prohibited.

Another drawback of a trimmer wheeled accessory with two wheels located behind and on opposite sides of the trimmer head is that the wheels extend laterally, preventing the trimmer head from being positioned near or adjacent to another object or plant.

What is needed is one trimmer wheeled support accessory that addresses the need to support the trimmer as it trims both horizontally and vertically, that is height adjustable, and that enables the trimmer head to be placed close to plants or other objects.

SUMMARY OF THE INVENTION

It is an object of the present invention to provide a wheeled accessory that can be selectively attached to a line trimmer and allows the trimmer to roll over a surface.

It is another object of the present invention to provide a trimmer wheeled accessory that supports the trimmer head when cutting horizontal and vertical paths.

It is a further object of the present invention to provide a trimmer wheeled accessory that enables the user to easily adjust and maintain the trimmer head at a constant height while walking.

It is a further object of the present invention to allow for the normal operation of a line trimmer without removal or frequent adjustment of the trimmer wheeled extension arm.

It is a still further object of the present invention to allow the feed line feature of the trimmer to function with little or no interference from the trimmer wheeled accessory.

These and other objects of the present invention are met by a trimmer wheeled accessory for a handheld, portable, gas or electric powered, line trimmer that selectively attaches to the trimmer's main pole. The accessory includes an extension arm that attaches to the trimmer's main pole and extends longitudinally and forward from the trimmer head to support the trimmer head an even height above the ground during operation. The extension arm includes an adjustable first clamp member used to attach the extension arm to the trimmer's main pole. The first clamp member allows the length of the extension arm that extends beyond the trimmer head to be adjusted. The first clamp member also allows the extension arm to axially rotate and laterally pivot around the main pole. This axial rotation feature allows the user to align the trimmer head for either vertical or horizontal cutting. Attached to the distal end of the extension arm is a wheel assembly that supports and allows the distal end of the extension pole to roll on the ground or grass. When the accessory is attached to the main pole, a fulcrum for the line trimmer is created in front of the trimmer head, which provides greater control for the user. In the preferred embodiment, the wheel assembly is able to rotate freely 360 degrees. An optional clamp member may be provided between the wheel assembly and the distal end of the extension arm that enables the wheel assembly to selectively rotate and lock in different positions during use. This feature is especially useful when the user wants to align the trimmer head in an offset position relative to the path of the wheel assembly.

The extension arm also includes an optional second clamp member that allows the length of the extension arm relative to the main pole to be adjusted. The second clamp member also allows adjustment of the forward and aft angular orientation of the extension pole relative to the main pole. The axis of rotation of the second clamp member is perpendicular to the axis of rotation of the first clamp member. By allowing adjustment of the forward and aft orientation of the extension pole, the relative pitch of the extension pole on the main pole may be adjusted so that the trimmer head may be maintained at the desired cutting height as the trimmer is moved.

DESCRIPTION OF THE PREFERRED EMBODIMENT(S)

Figure 1:
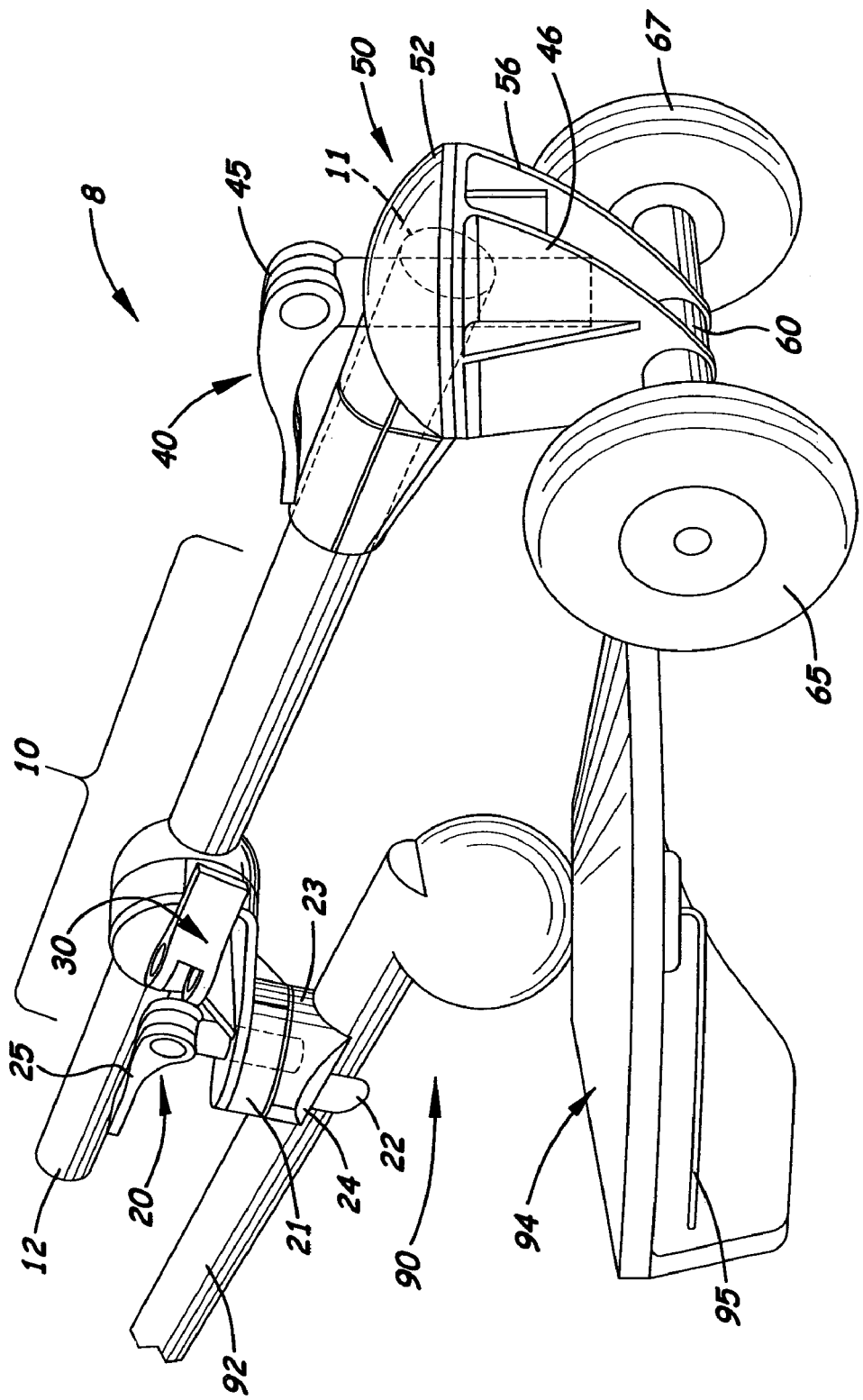
FIG. 1 is a perspective view of the trimmer wheeled accessory arm attached to a line trimmer.
Figure 2:
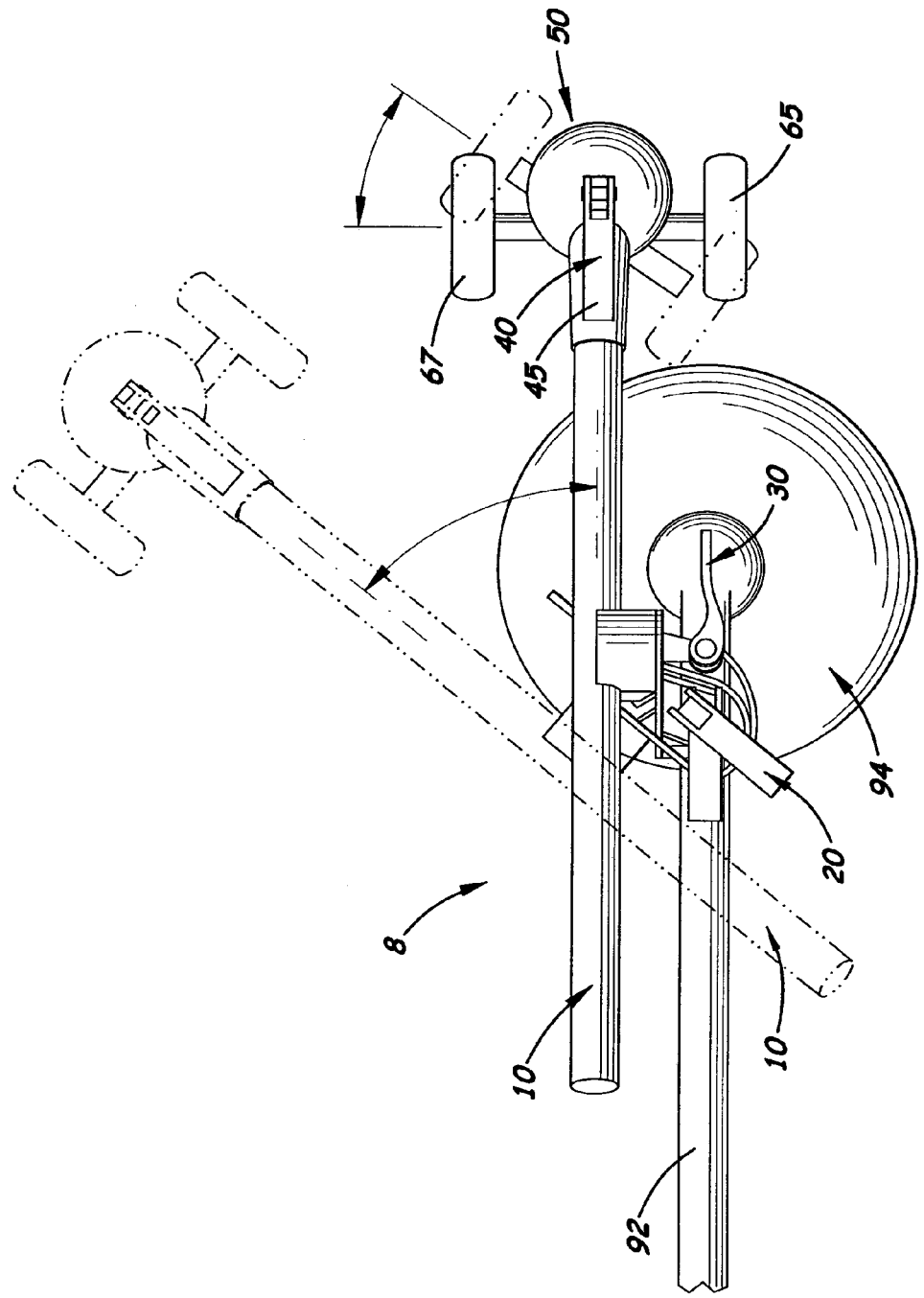
FIG. 2 is a top plan view of the trimmer wheeled accessory shown in FIG. 1.
Figure 3:
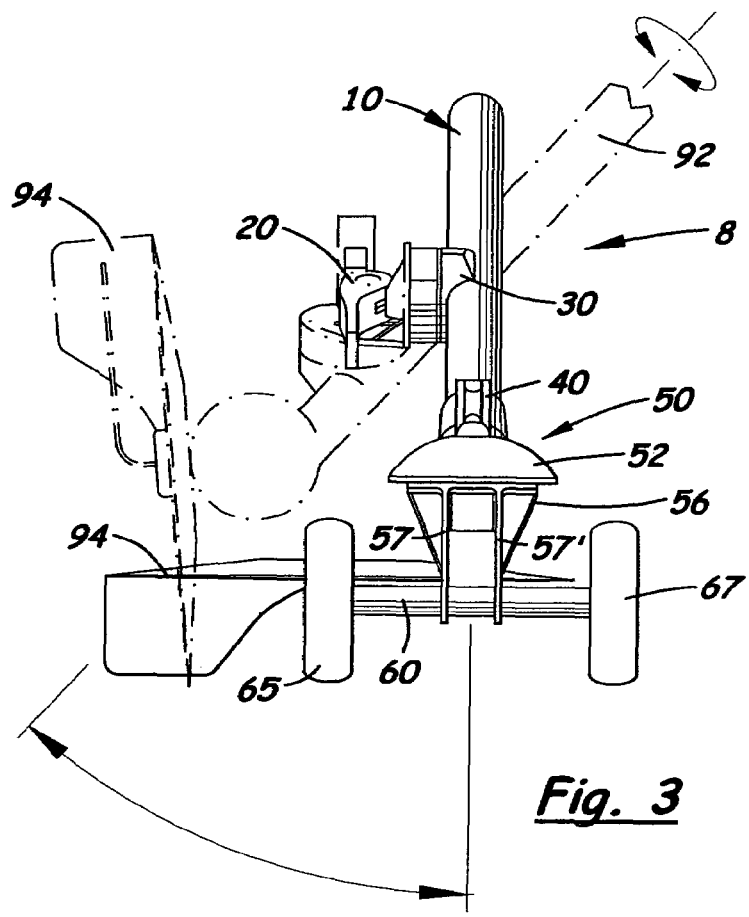
FIG. 3 is a front elevational view of the trimmer wheeled accessory.
Figure 4:
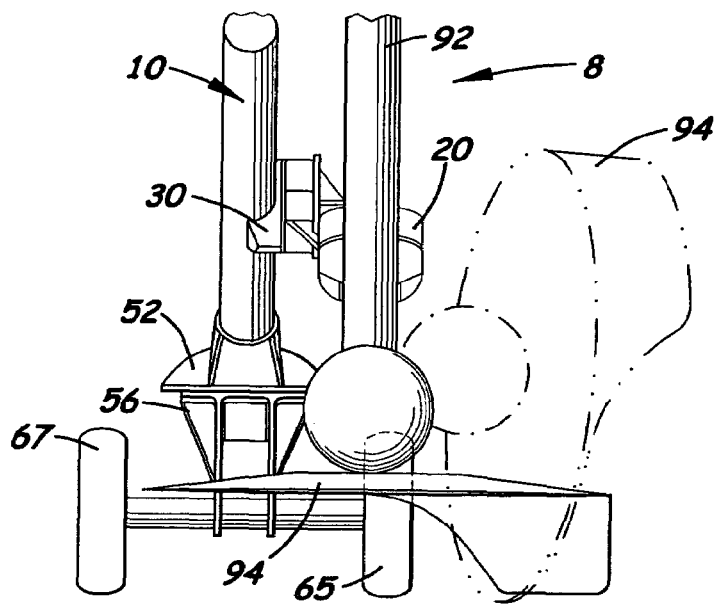
FIG. 4 is a rear elevational view of the trimmer wheeled accessory.
Figure 5:
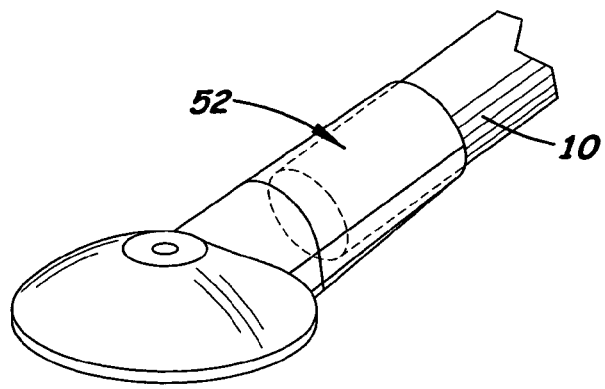
FIG. 5 is a perspective view of the bracket used to attach the wheel assembly to the distal end of the extension arm.
Figure 6:
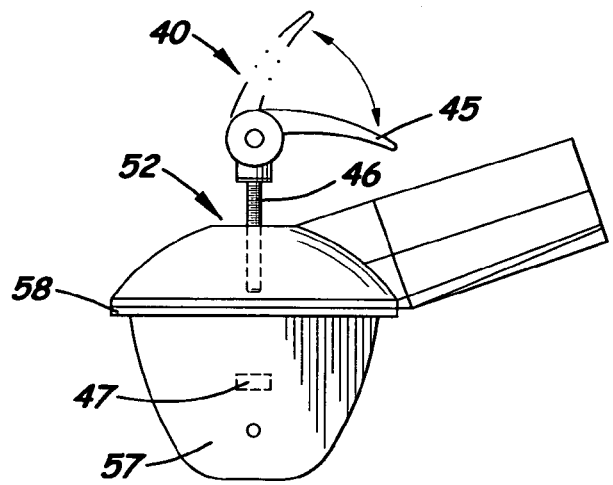
FIG. 6 is a right side elevational view of the bracket shown in FIG. 5.
Figure 7:
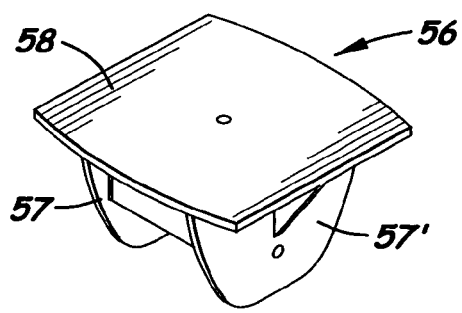
FIG. 7 is a perspective view of the axle support on the wheel assembly.

Shown and described in the accompanying FIGS. is a trimmer wheeled accessory 8 for a handheld, portable, gas- or electric-powered line trimmer 90 that selectively attaches to the trimmer's main pole 92. The accessory 8 includes an elongated extension arm 10 that extends longitudinally and distally from the trimmer head 94 to support the trimmer head 94 on the ground during operation. The extension arm 10 includes an adjustable first clamp member 20 used to attach the extension arm 10 to approximately the middle section on the main pole 92. The first clamp member 20 allows the length of the extension arm 10 that extends beyond the trimmer head 94 to be adjusted to place the trimmer head 94 at different elevations during use. The first clamp member 20 also allows the extension arm 10 to axially rotate to align the trimmer head 94 in either a vertical or horizontal orientation. The first clamp member 20 also allows the extension arm 10 to pivot laterally around the main pole 92 as shown in FIG. 2.

Figure 10:
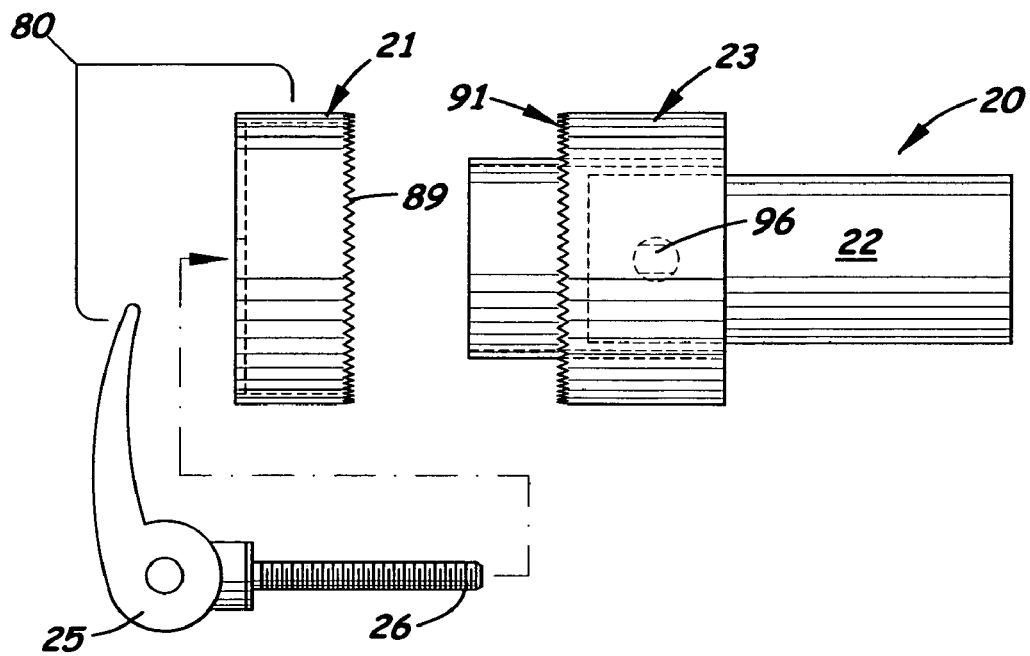
FIG. 10 is a side elevational view of a clamp member.

In the preferred embodiment, the first clamp member 20 includes a lower clamp member 23 with an adjustable strap 22 that attaches to the main pole 92. Attached to the lower clamp member 23 is a rotating upper clamp member 21. As shown in FIG. 10, disposed between the lower clamp member 23 and upper clamp member 21 is a handle 25 mounted on a and center post 26 that interconnects with the strap 22 to tighten or loosen the strap 22 around the main pole 92. A more detailed description of the first clamp member 20 is discussed below.

Attached to the distal end 11 of the extension arm 10 is a wheel assembly 50 that supports and allows the distal end 11 of the extension arm 10 to roll on the ground or grass.

The wheel assembly 50, shown more clearly in FIGS. 1, 3, 5–7, includes an upper adapter 52 that securely attaches to the distal end 11 of the extension arm 10. Rotatingly attached to the upper adapter 52 is a lower adapter 56. Formed on the lower adapter 56 are two downward extending wings 57, 57'. An axle 60 is transversely aligned between the two downward extending wing members 57, 57' and two wheels 65, 67 are attached to the axle 60. In the preferred embodiment, a locking member 40 is attached to the wheel assembly 50 that enables the user to lock the wheel assembly 50 in a fixed position on the extension arm 10. The locking member 40 includes a handle 45 with a center post 46 that extends through the upper and lower adapters 52, 56 and connects to a nut 47 located under the top flange member 58 on the lower adapter 56. During use, the locking member 40, center post 46, and nut 47 hold the adapters 52, 56 together and enable the lower adapter 56 to freely rotate under the upper adapter 52. During use, the handle 45 is manually opened and closed so that the lower adapter 56 may be selectively rotated or locked in position under the upper adapter 52 to change the orientation of the wheels 65, 67. By changing the orientation of the wheels 65, 67, the trimmer head 94 may be aligned in an offset position relative to the directional path of the wheel assembly 50 during use.

Figure 8:
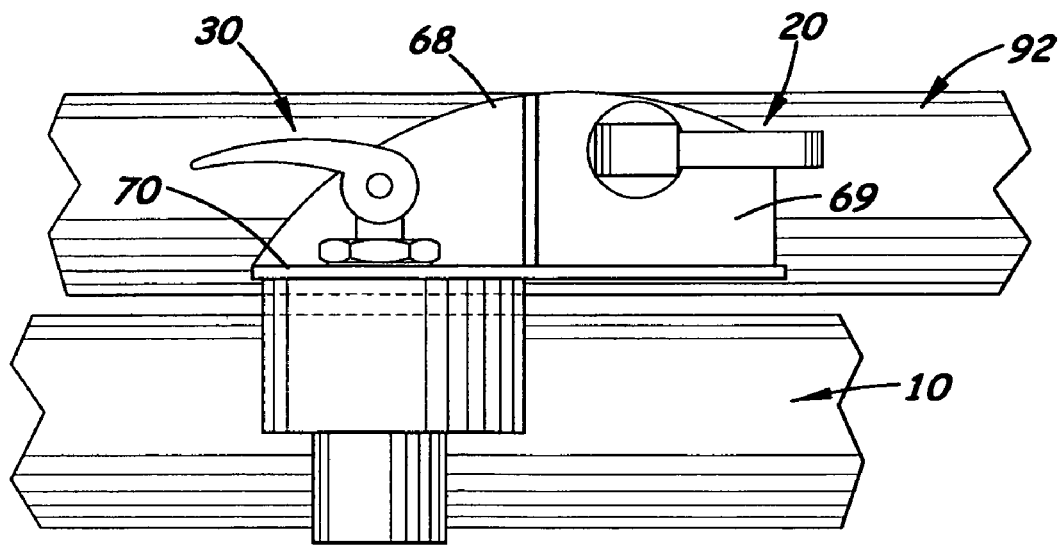
FIG. 8 is a side elevational view of the L-shaped coupler with the second and third clamp members attached thereto.
Figure 9:
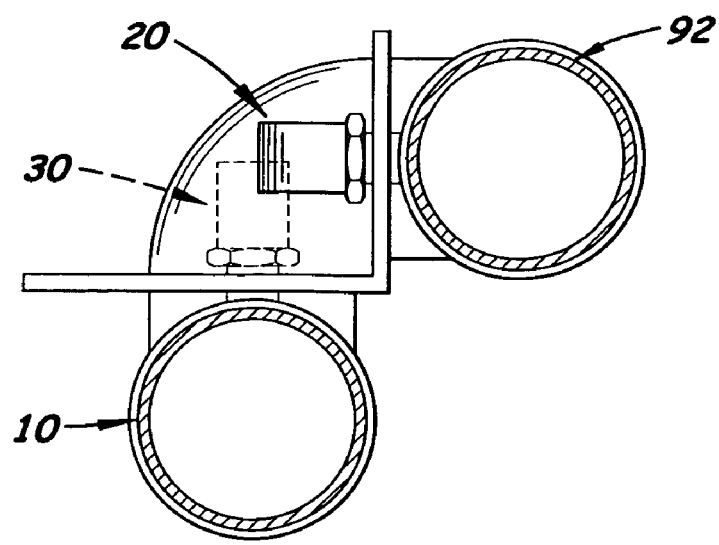
FIG. 9 is an end elevational view of the L-shaped coupler shown in FIG. 8.

Disposed between the first clamp member 20 and the proximal end 12 of the extension arm 10 is an optional second clamp member 30 that allows the angular orientation of the extension arm 10, relative to the main pole 92, to be adjusted. In the preferred embodiment, the first and second clamp members 20, 30 are perpendicularly aligned on an L-shaped bracket 68. As shown in FIGS. 8 and 9, the L-shaped bracket 68 supports both the first and second clamp members 20, 30, respectively, when they are attached to the main pole 92 and extension leg 10. Formed on one end of the bracket 68 is a first support flange 69 upon which said first clamp member 20 is located. On the opposite end of the bracket 68 is a second support flange 70 upon which the second clamp member 30 is located. The first and second support flanges 69, 70, respectively, are perpendicularly oriented to each other.

Figure 11:
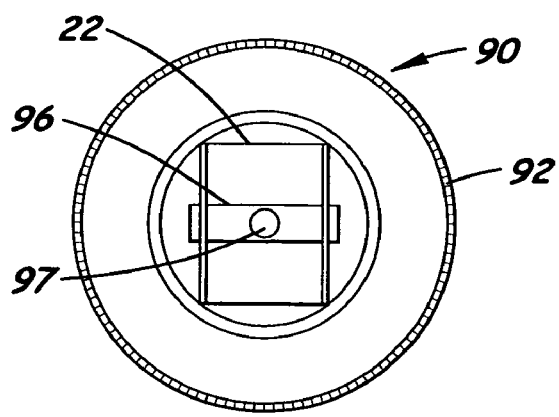
FIG. 11 is a top plan view of the lower strap housing shown in FIG. 10.

The first and second clamp members 20 and 30 are identical and are similar to the locking member 40 used on the wheel assembly 50. As shown in FIGS. 10 and 11, the clamp member 20 includes a pivoting handle 25 attached to the end of a threaded center post 26. The center post 26 extends into an upper and lower clamp member 21, 23, respectively. The distal end of the center post 26 connects to a rod 96. Formed on the rod 96 is a threaded, transversely aligned bore 97. The rod 96 extends transversely over a U-shaped strap 22 that mounts inside the lower clamp member 23. The strap 22 extends downward from an opening 24 formed on the lower clamp member 23 and around the main pole 92 to connect the lower clamp member 23 thereon. The upper and lower clamp members 21, 23 are cylindrical and include ring structures 89, 91, respectively, with teeth formed thereon. During assembly, the upper and lower clamp members 21, 23 are longitudinally aligned so that the teeth mesh to lock the upper and lower clamp members 21, 23 together. During use, the handle 25 is rotated to release pressure on the center post 26 and strap 22 so that the strap 22 may be moved longitudinally or rotated around the main pole 92. Simultaneously, the user may rotate the upper clamp member 21 to reposition the handle 25 for easier operation.

In the preferred embodiment, the extension arm 10 is made of aluminum and measures approximately 18 inches in length and ¾ inches in diameter. The wheels 65, 67 are approximately 2 inches in diameter and approximately 3 to 7 inches apart when attached to the axle 60.

During use, the extension arm 10 is selected and the first clamp member 20 is attached to the main pole 92 so that the wheel assembly 50 is positioned a sufficient distance in front of the trimmer head 94 to position the trimmer head 94 at the proper elevation. If the second clamp member 30 is used, then the first clamp member 20 is positioned proximally approximately 6 to 12 inches behind the trimmer head 94. Once the initial location of the first clamp member 20 is determined, the extension arm 10 is then rotated over the main pole 92 so that the extension arm 10 is disposed either above or on one side of the main pole 92. The handle 25 is then tightened to lock the first clamp member 20 in position on the main pole 92.

The third clamp member 30 is then used to adjust the orientation of the wheel assembly 50.

If a second clamp member 30 is used, the second clamp member 30 is manipulated to finely adjust the orientation of the wheel assembly 50 relative to the trimmer head 94. As mentioned above, the second clamp member 30 allows the user to change the pitch of the extension arm 10 relative to the main pole 92. This adjustment feature allows users with different standing heights to adjust the pitch of the extension arm 10 so that the trimmer head 94 cuts evenly when the wheel assembly 50 is pushed or pulled over a support surface.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An adjustable line trimmer, comprising:
   a. a line trimmer including a main pole, a handle attached to one end of said main pole, and a trimmer head attached to the end of the main pole opposite said handle, said trimmer head including a rotating line capable of cutting vegetation;
   b. straight extension arm having a distal end and a proximal end;
   c. a wheel assembly attached to said distal end of said extension arm, said wheel assembly including at least one wheel rotatably mounted thereon; and,
   d. a first clamp member used to longitudinally align and attach said extension arm to said main pole on said line trimmer so that said distal end of said extension arm extends forward from the trimmer head, said first clamp member able to move longitudinally over said main pole thereby allowing said wheel assembly to be positioned in front of said trimmer head at different distances to support said trimmer head at different desired angles and elevations above a support surface when said handle is held and said line trimmer is pushed or pulled over a support surface; and,
   e. a second clamp member attached to said extension arm that enables the length of said extension arm between said first clamp member and said wheel assembly to be adjusted thereby allowing the pitch of said extension arm relative to the main pole to be adjusted.

2. The line trimmer, as recited in claim 1, further including said wheel assembly being rotatably attached to said distal end of said extension arm and a locking means for selectively locking said wheel assembly in a desired position on said extension arm.

3. The line trimmer, as recited in claim 1, further including said wheel assembly being rotatably attached to said distal end of said extension arm and a locking means for selectively locking said wheel assembly in a desired position on said extension arm.

4. The line trimmer, as recited in claim 1, wherein said first and second clamp members are formed on a rotating L-shaped bracket selectively attaching said extension arm to the main pole, said L-shaped bracket includes a first support flange that supports said first clamp member and a second support flange that supports said second clamp member, said first support flange and said second support flange being perpendicularly aligned thereby perpendicularly aligning said first clamp member and said second clamp member.

5. The line trimmer, as recited in claim 4, further including said wheel assembly being rotatably attached to said distal end of said extension arm and a locking means enabling said wheel assembly to be selectively locked in a desired position on said extension arm.

6. The line trimmer, as recited in claim 1, wherein said first clamp member includes an upper clamp member, a lower clamp member, a center post, a pivoting handle attached to said post, and a strap, said upper and lower clamp members including teeth that selectively engage when said upper and lower clamp members are forced together, said strap member extending through said lower clamp member and wrapped around a main pole on a line trimmer, said center post extending through said upper clamp member and connecting to said strap to connect said upper clamp member and said lower clamp member together and to tighten said strap around the main pole.

7. An accessory for a line trimmer that includes a main pole with a trimmer head attached at one end, said accessory comprising:
   a. a straight extension arm having a distal end and a proximal end;
   b. a wheel assembly attached to said distal end of said extension arm, said wheel assembly including at least one wheel mounted thereon;
   c. an adjustable first clamp member attached to said proximal end of said extension arm, said first clamp member capable of being selectively attached to a main pole on a line trimmer to connect said extension arm to the main pole, said first clamp member being adjustable along said extension arm so that the distance between said wheel assembly and a trimmer head attached to the main pole may be adjusted to support the trimmer head at different angles and elevations when the main pole is held and said wheel is rolled across a support surface;
   d. a second clamp member attached to said extension arm that enables the angular orientation of said extension arm to be adjusted relative to the main pole on the line trimmer;
   e. a locking member attached to said wheel assembly enabling said wheel assembly to be selectively locked in position on said extension arm; and,
   f. wherein said first and second clamp members are formed on a rotating L-shaped bracket selectively attaching said extension arm to the main pole, said L-shaped bracket includes a first support flange that supports said first clamp member and a second support flange that supports said second clamp member, said first support flange and said second support flange being perpendicularly aligned.

8. The accessory, as recited in claim 7, wherein said first clamp member includes an upper clamp member, a lower clamp member, a center post, a pivoting handle attached to said post, and a strap, said upper and lower clamp members including teeth that selectively engage when said upper and lower clamp members are forced together, said strap member extending through said lower clamp member and wrapped around a main pole on a line trimmer, said center post extending through said upper clamp member and connecting to said strap to connect said upper clamp member and said lower clamp member together and to tighten said strap around the main pole.

9. The accessory, as recited in claim 7, wherein said wheel is rotatably mounted on said wheel assembly.

10. The accessory, as recited in claim 7, wherein said wheel assembly is fixed in position on said extension pole.

11. The accessory for a line trimmer that includes a main pole with a trimmer head attached at one end, said accessory comprising:
    a. a straight extension arm having a distal end and a proximal end;
    b. a wheel assembly attached to said distal end of said extension arm, said wheel assembly including at least one wheel mounted thereon;
    c. an adjustable first clamp member attached to said proximal end of said extension arm, said first clamp member includes an upper clamp member, a lower clamp member, a center post, a pivoting handle attached to said post, and a strap, said upper and lower clamp members including teeth that selectively engage when said upper and lower clamp members are forced together, said strap member extending through said lower clamp member and wrapped around a main pole on a line trimmer, said center post extending through said upper clamp member and connecting to said strap to connect said upper clamp member and said lower clamp member together and to tighten said strap around the main pole, said first clamp member being adjustable along said extension arm so that the distance between said wheel assembly and a trimmer head attached to the main pole may be adjusted to support the trimmer head at different angles and elevations when the main pole is held and said wheel is rolled across a support surface;

d. a second clamp member attached to said extension arm that enables the angular orientation of said extension arm to be adjusted relative to the main pole on the line trimmer; and e. a locking member attached to said wheel assembly enabling said wheel assembly to be selectively locked in position on said extension arm.

* * * * *